(12) United States Patent
Hung et al.

(10) Patent No.: US 10,209,452 B1
(45) Date of Patent: Feb. 19, 2019

(54) METHOD FOR FABRICATING SILICON PHOTONICS PACKAGE, ACTIVE ALIGNMENT METHOD FOR LIGHT COUPLING, AND SILICON PHOTONICS PACKAGE

(71) Applicant: CLOUD LIGHT TECHNOLOGY LIMITED, Hong Kong (HK)

(72) Inventors: Vincent Wai Hung, Hong Kong (HK); Vivian Wei Ma, Hong Kong (HK)

(73) Assignee: CLOUD LIGHT TECHNOLOGY LIMITED, Hong Kong (HK)

( * ) Notice: Subject to any disclaimer, the term of this patent is extended or adjusted under 35 U.S.C. 154(b) by 0 days.

(21) Appl. No.: 15/917,877

(22) Filed: Mar. 12, 2018

(51) Int. Cl.
- *G02B 6/32* (2006.01)
- *G02B 6/30* (2006.01)
- *G02B 6/122* (2006.01)
- *G02B 6/136* (2006.01)

(52) U.S. Cl.
CPC .............. *G02B 6/32* (2013.01); *G02B 6/122* (2013.01); *G02B 6/30* (2013.01); *G02B 6/136* (2013.01)

(58) Field of Classification Search
CPC ........................................... G02B 2006/12102
See application file for complete search history.

(56) References Cited

U.S. PATENT DOCUMENTS

| 6,502,960 | B2 | 1/2003 | Naoe et al. |
| 6,810,195 | B2 | 10/2004 | Bhagavatula et al. |
| 6,934,449 | B2 | 8/2005 | Uekawa et al. |
| 6,937,406 | B2 | 8/2005 | Matsushima et al. |
| 7,422,377 | B2 | 9/2008 | Farr |
| 2017/0059781 | A1* | 3/2017 | Fortusini .................. G02B 6/32 |
| 2018/0314009 | A1* | 11/2018 | Nakazuru ................ G02B 6/30 |

* cited by examiner

Primary Examiner — Omar R Rojas

(57) ABSTRACT

A silicon photonics package includes an L-shaped block formed from a cuboid having a through-hole through front and rear faces thereof. The L-shaped block includes two horizontal inner surfaces lying in a plane longitudinally bisecting a section of the through-hole, a bisected through-hole formed between the two horizontal inner surfaces, and a vertical inner surface. A lens block with a lens or lens array is bonded on the rear face of the L-shaped block. A vertical metal pad is attached on the front face of the L-shaped block. The vertical metal pad is soldered together with two horizontal metal pads on a photonic integrated circuit block formed with a waveguide or waveguide array such that the center of the optical lens is optically aligned with the waveguide. A method for fabricating the silicon photonics package, and an active alignment method for light coupling are also disclosed.

20 Claims, 17 Drawing Sheets

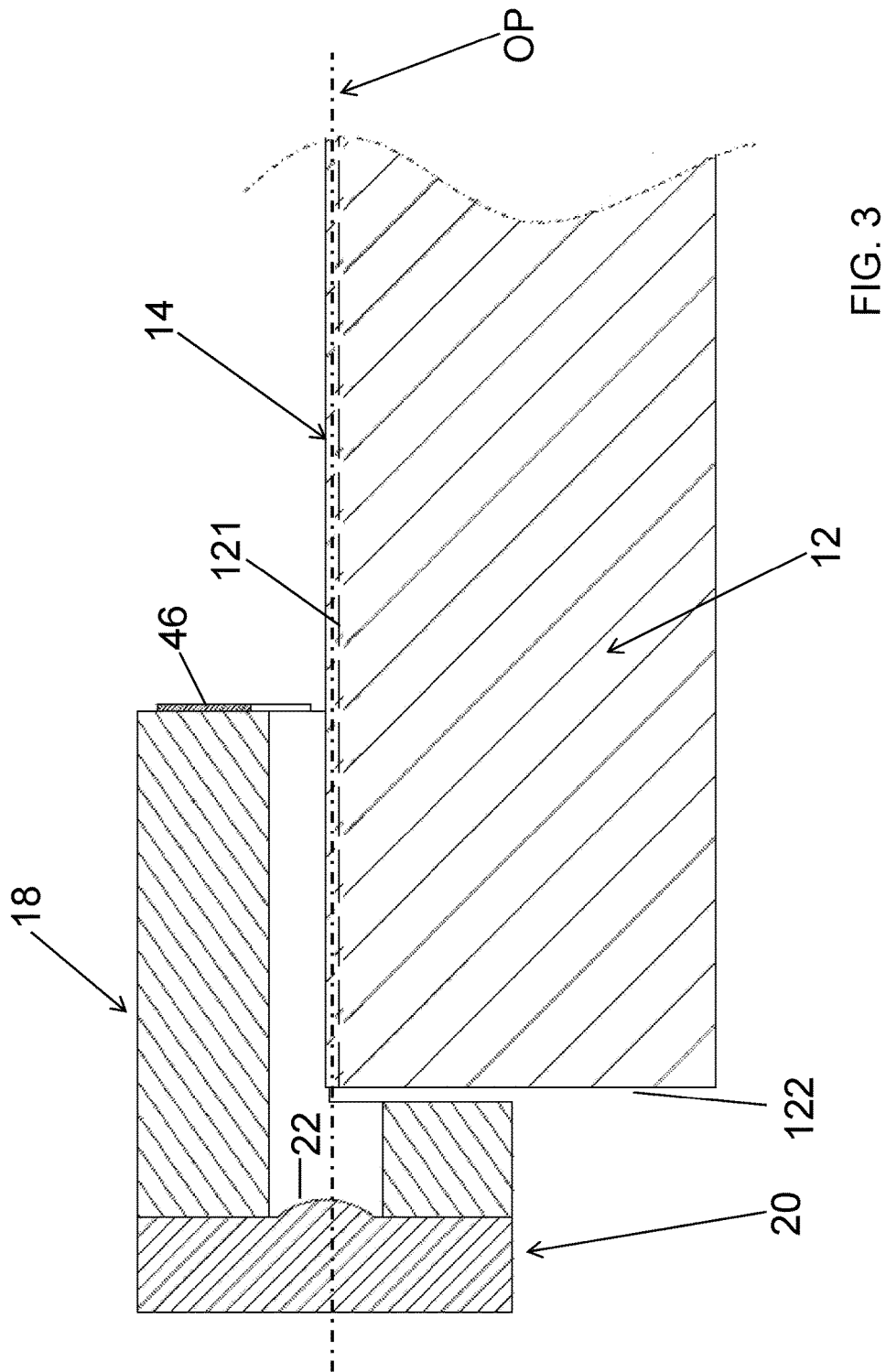

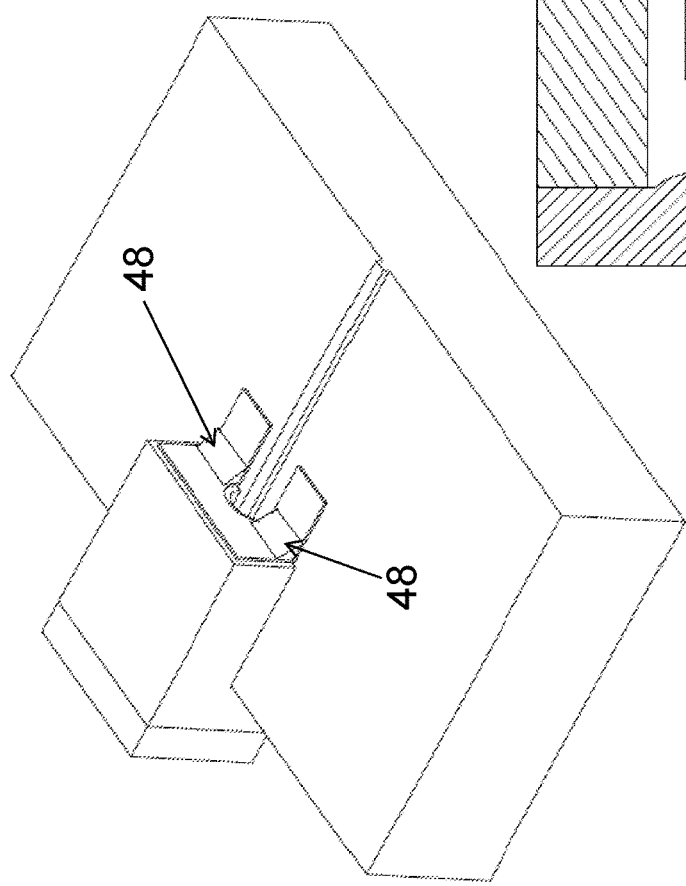
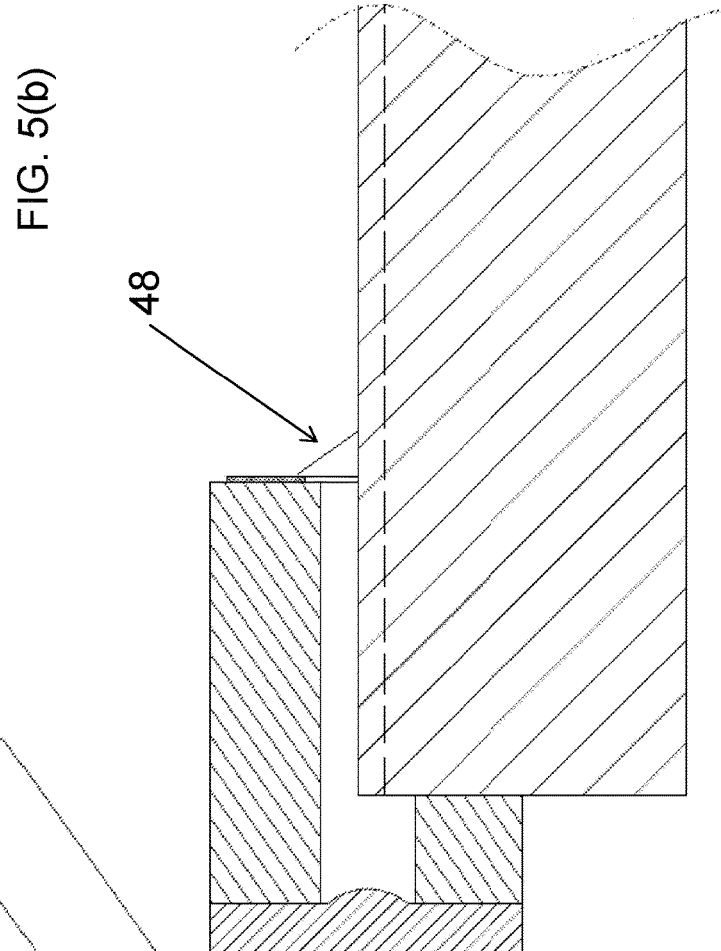
FIG. 5(a)
FIG. 5(b)

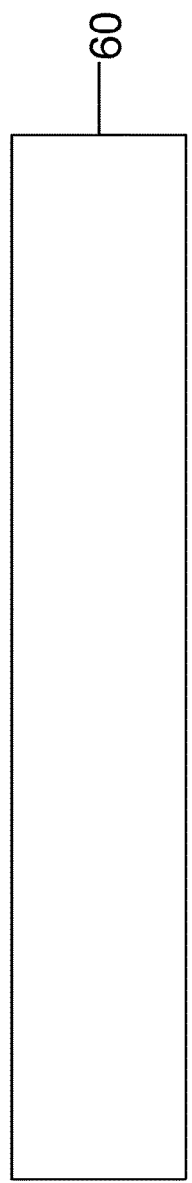
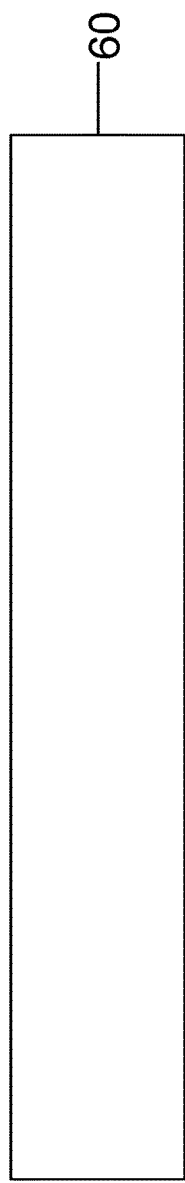
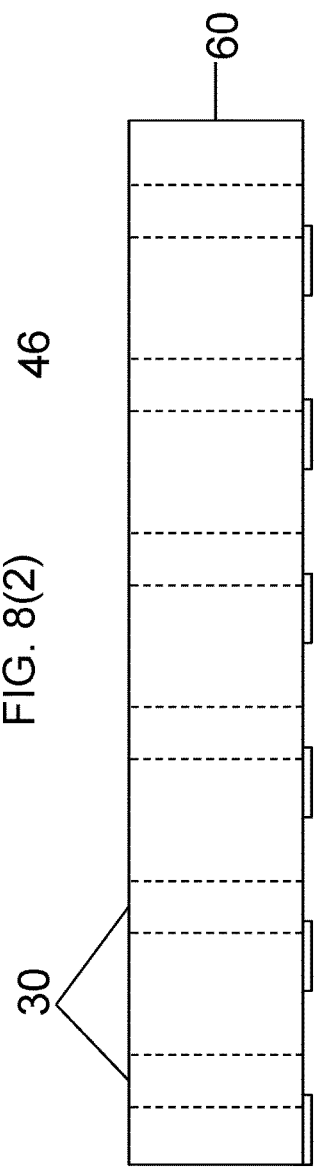
FIG. 8(1)  FIG. 8(2)  FIG. 8(3)

METHOD FOR FABRICATING SILICON PHOTONICS PACKAGE, ACTIVE ALIGNMENT METHOD FOR LIGHT COUPLING, AND SILICON PHOTONICS PACKAGE

FIELD OF THE TECHNOLOGY

The present disclosure generally relates to optical communication using silicon photonics technology, and more specifically to a micro optical module for use in silicon photonics, a method for fabricating silicon photonics package, an active alignment method for light coupling, and a silicon photonics package.

BACKGROUND

In last decade, high-speed signal transmission has already far exceeded the capability of copper cabling. The standard copper-based Ethernet networking is inadequate and replaced by fiber-optical communication system. Today's data centers are required to satisfy a large amount of activities, such as web-search, scientific computations, social networks, file storage and distributed file systems, inducing an unprecedented increase in data transmission. Data rates of 100 Gbps show their premium importance, which is even a challenge in fiber-optical network.

Due to its promise of high density integration, mature fabrication processing and compatibility with microelectronics, silicon photonics has attracted attention in optical telecommunication. In recent years, it has gradually become a promising technology offering high density and high speed data transmission.

Based on highly sophisticated silicon semiconductor technology, silicon photonic would provide an inexpensive integrated electronic-photonic platform, in which ultra-compact photonic devices and electronic circuits are converged. The low-cost high-volume photonic integrated circuits (PICs) with integrated electronics would simultaneously access the full potential for high-speed signaling and sensing, and subsequent logical operations and computations.

The PIC may consist of numerous scaled optical components, such as waveguides, MMIs, lasers and optical ring resonator. Waveguide is normally the most basic structure used for guiding light and interconnecting different elements on an optical chip. It also ensures the communications with outside by emitting the light and receiving it in turn. Of course, it should guarantee a sufficiently low propagation loss for constructing and integrating these photonic functions.

Silicon photonics packaging, which provides the substrate, support and protection to a silicon photonics system and also provides channel for data transmitting, is the assurance for a reliable communication. Much research has been done in the field. Used for telecom and datacom applications, fiber-to-PIC coupling is the most important aspect of photonic packaging. Many efforts have been made in order to improve the optical coupling efficiency.

In a transmitting system, good optical coupling efficiency is ensured by good alignment between the light from PIC and the optical fiber, or say, between the waveguide who guides the light and the optical fiber. In order to allow a relatively large tolerance of assembly and reduce the fiber assembly difficulty, an optical system is typically inserted between PIC and the fiber. Since the light from PIC inevitably has a radiation angle, a collimator lens is usually used in the system to make the light collimate and easy to be managed into the fiber with higher coupling efficiency. In miniature and compact PIC systems, the assembling of the collimator lens with the PIC by precise alignment is a challenge. Normally, active alignment method is used for this assembly. Active alignment here means aligning the components with some feedback indicating whether adjustment is needed for the alignment.

Hence, there is a need to provide an improved fabricating and alignment method for silicon photonics packaging.

SUMMARY

According to one aspect of the disclosure, there is provided a method of fabricating a silicon photonics package, the method including:

forming an optical lens assembly, the step of forming the optical lens assembly including:
  providing a cuboid;
  forming a through-hole extending through opposite first and second faces of the cuboid;
  cutting a rectangular block out from the cuboid to form an L-shaped mounting block with an L-shaped inner portion comprising two first inner surfaces lying in a plane extending perpendicularly from the first face and longitudinally bisecting a section of the through-hole, a bisected through-hole formed between the two first inner surfaces, and a second inner surface lying perpendicularly to the two first inner surfaces;
  fixing a first metal pad on the first face, the first metal pad having two ends extending to two edges of the first face and disposed at two opposite sides of the bisected through-hole respectively;
  providing an optical lens block having an optical lens or an optical lens array formed in a middle region thereof; and
  bonding the optical lens block on the second face in a position such that a center of the optical lens or a center of each optical lens in the optical lens array is lying in the plane in which the two first inner surfaces lie.

In one embodiment, the method of fabricating a silicon photonics package may further include: providing a photonic integrated circuit block having an edge along which a first wall and a second wall of the photonic integrated circuit block join, an optical waveguide or a waveguide array provided on the first wall of the photonic integrated circuit block and extending perpendicularly from the edge; and attaching two second metal pads on the first wall of the photonic integrated circuit block respectively at two opposite sides of the optical waveguide or the waveguide array.

In one embodiment, the method of fabricating a silicon photonics package may further include:

placing the optical lens assembly at the edge of the photonic integrated circuit block in a position such that the two first inner surfaces of the optical lens assembly rest on the two second metal pads on the first wall of the photonic integrated circuit block respectively, thereby passively aligning the center of the optical lens with the optical waveguide, or the centers of the optical lenses in the optical lens array with the waveguide array, in a Z direction perpendicular to the first wall of the photonic integrated circuit block, and the second inner surface of the optical lens assembly is hanging on the edge and facing the second wall of the photonic integrated circuit block at a distance therefrom;

actively aligning the center of the optical lens with the optical waveguide or the centers of the optical lenses in the optical lens array with the waveguide array by adjusting the optical lens assembly in a Y direction along the edge of the photonic integrated circuit block and orthogonal to the Z direction; and actively aligning the optical lens with the optical waveguide or the optical lenses in the optical lens array with the waveguide array optically to optimize optical coupling by adjusting the optical lens assembly in an X direction along the optical waveguide and orthogonal to the Y and Z directions.

In one embodiment, the method of fabricating a silicon photonics package may further include, after the aligning steps, fixing the optical lens assembly on the photonic integrated circuit block by soldering one of the two ends of the first metal pad and a corresponding one of the two second metal pads together, and soldering another one of the two ends of the first metal pad and another corresponding one of the two second metal pads together.

According to another aspect of the disclosure, there is provided a method of batch fabricating of optical lens assemblies for silicon photonics packaging, the method including:

providing a first silicon wafer having opposite first and second faces;

attaching a plurality of metal pads on the first face in at a predetermined interval;

forming a plurality of through-holes extending through the first and second faces at the corresponding predetermined interval by a first deep reactive ion etching process after wafer alignment, in a position such that two ends of each metal pad extend to a plane extending perpendicularly from the first face and longitudinally bisecting a section of a corresponding through-hole;

removing a plurality of rectangular blocks from the first face at the predetermined interval by a second deep reactive ion etching process after wafer alignment to form a plurality of pre-cut L-shaped mounting blocks, each having an L-shaped inner portion comprising two first inner surfaces lying in the plane extending perpendicularly from the first face and longitudinally bisecting the section of the through-hole, a bisected through-hole formed between the two first inner surfaces, and a second inner surface lying perpendicular to the two first inner surfaces;

providing a second silicon wafer defining an optical lens block having a plurality of optical lenses or lens arrays formed in a middle region thereof at the predetermined interval;

bonding the second silicon wafer on the second face of the first silicon wafer in a position such that a center of each optical lens is lying in the plane in which the two first inner surfaces lie; and dicing the bonded first and second silicon wafers at the predetermined interval to form a plurality of single optical lens assemblies.

In one embodiment, the method of batch fabricating of optical lens assemblies for silicon photonics packaging may include replacing the dicing step by cutting the bonded first and second silicon wafers at a wider interval which is a multiple of the predetermined interval to form a plurality of multiple optical lens assemblies.

According to yet another aspect of the disclosure, there is provided a silicon photonics package including:

an optical lens assembly including:

a cuboid having a through-hole extending through opposite first and second faces of the cuboid, and a rectangular block cut out from the cuboid to form an L-shaped mounting block with an L-shaped inner portion comprising two first inner surfaces lying in a plane extending perpendicularly from the first face and longitudinally bisecting a section of the through-hole, a bisected through-hole formed between the two first inner surfaces, and a second inner surface lying perpendicularly to the two first inner surfaces; and an optical lens block having an optical lens or an optical lens array formed in a middle region thereof, the optical lens block being bonded on the second face in a position such that a center of the optical lens or a center of each optical lens in the optical lens array is lying in the plane in which the two first inner surfaces lie.

In one embodiment, the silicon photonics package may further include a first metal pad fixed on the first face, the first metal pad having two ends extending to two edges of the first face and disposed at two opposite sides of the bisected through-hole respectively.

In one embodiment, the silicon photonics package may further include: a photonic integrated circuit block having an edge along which a first wall and a second wall of the photonic integrated circuit block join, an optical waveguide or a waveguide array provided on the first wall of the photonic integrated circuit block and extending perpendicularly from the edge; and two second metal pads fixed on the first wall of the photonic integrated circuit block at two opposite sides of the optical waveguide or the waveguide array respectively; wherein the optical lens assembly is fixed at the edge of the photonic integrated circuit block by solders applied between the two ends of the first metal pad and the two second metal pads in a position such that the two first inner surfaces of the optical lens assembly rest on the two second metal pads on the first wall of the photonic integrated circuit block respectively, the second inner surface of the optical lens assembly is facing the second wall of the photonic integrated circuit block, and the optical lens is optically aligned with the optical waveguide.

In one embodiment, the two second metal pads extend perpendicularly from the edge of the photonic integrated circuit block and have a length longer than that of the two first inner surfaces of the optical lens assembly.

In one embodiment, the two second metal pads have a thickness of 0.1 um.

In one embodiment, the through-hole is circular, oblong, or rectangular in shape.

In one embodiment, the optical lens is a collimator lens.

Although the present disclosure is shown and described with respect to certain embodiments, it is obvious that equivalents and modifications will occur to others skilled in the art upon the reading and understanding of the specification. The disclosure in the present application includes all such equivalents and modifications, and is limited only by the scope of the claims.

BRIEF DESCRIPTION OF THE DRAWINGS

Specific embodiments of the present disclosure will now be described by way of example with reference to the accompanying drawings wherein:

FIG. 3 is a cross sectional view of the optical lens assembly mounted on a photonic integrated circuit block.

FIG. 5(a) is a perspective view showing the fixing of the optical lens assembly on the photonic integrated circuit block by soldering according to an embodiment of the present disclosure.

FIG. 5(b) is a cross sectional view showing the fixing of the optical lens assembly on the photonic integrated circuit block by soldering.

DETAILED DESCRIPTION

Figure 1A:
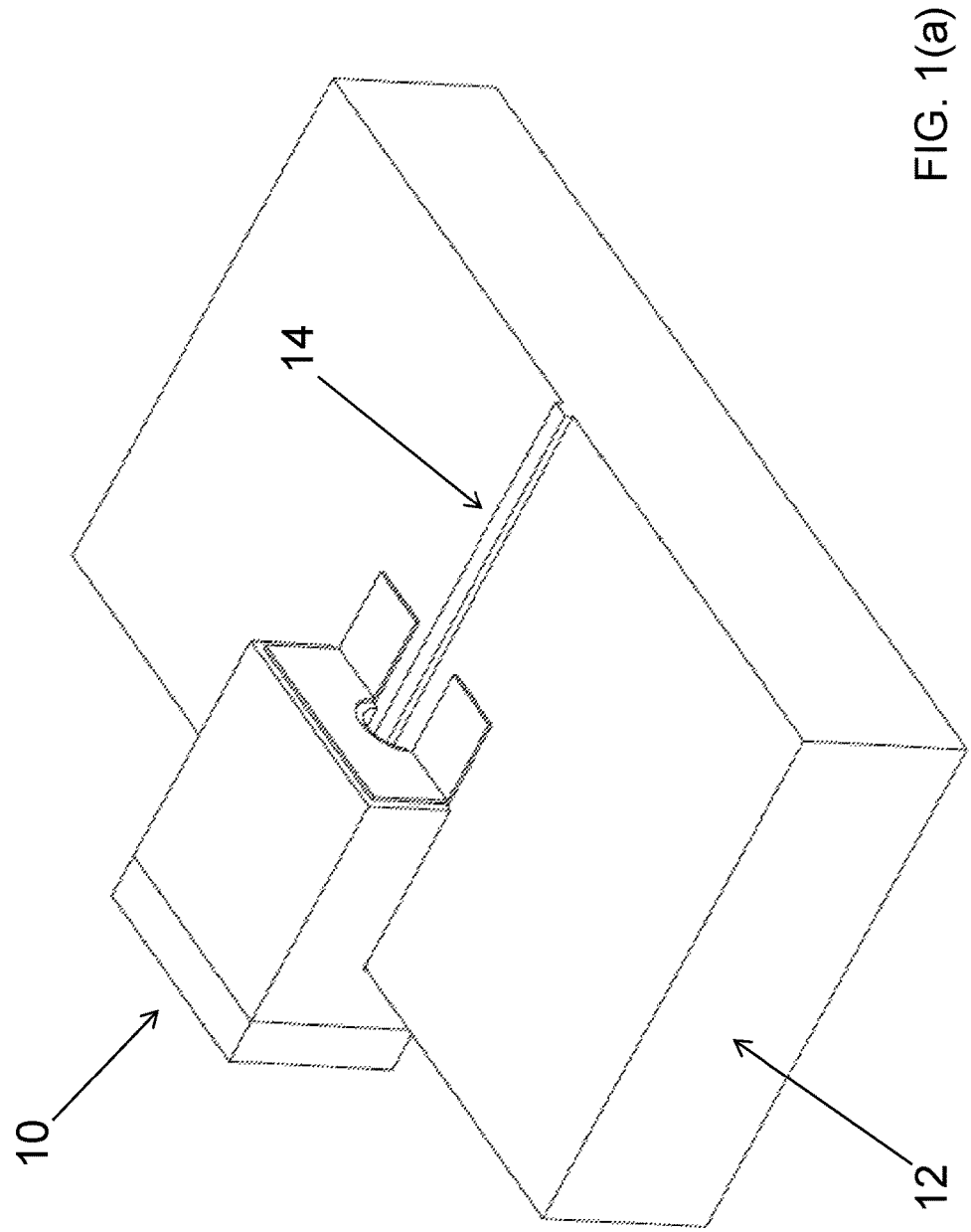
FIG. 1(a) is a perspective view of an optical lens assembly mounted on a photonic integrated circuit block according to an embodiment of the present disclosure.

Reference will now be made in detail to a preferred embodiment of the disclosure, examples of which are also provided in the following description. Exemplary embodiments of the present disclosure are described in detail, although it will be apparent to those skilled in the relevant art that some features that are not particularly important to an understanding of the disclosure may not be shown for the sake of clarity.

Furthermore, it should be understood that the present disclosure is not limited to the precise embodiments described below and that various changes and modifications thereof may be effected by one skilled in the art without departing from the scope of the protection. For example, elements and/or features of different illustrative embodiments may be combined with each other and/or substituted for each other within the scope of this disclosure and appended claims.

For illustration purposes, the terms such as "vertical", "horizontal", "front", "rear", "top" or "bottom" appeared hereinafter relate to the invention as it is oriented in the drawings. It is understood that the invention may assume various positions, except where expressly specified to the contrary.

Figure 1B:
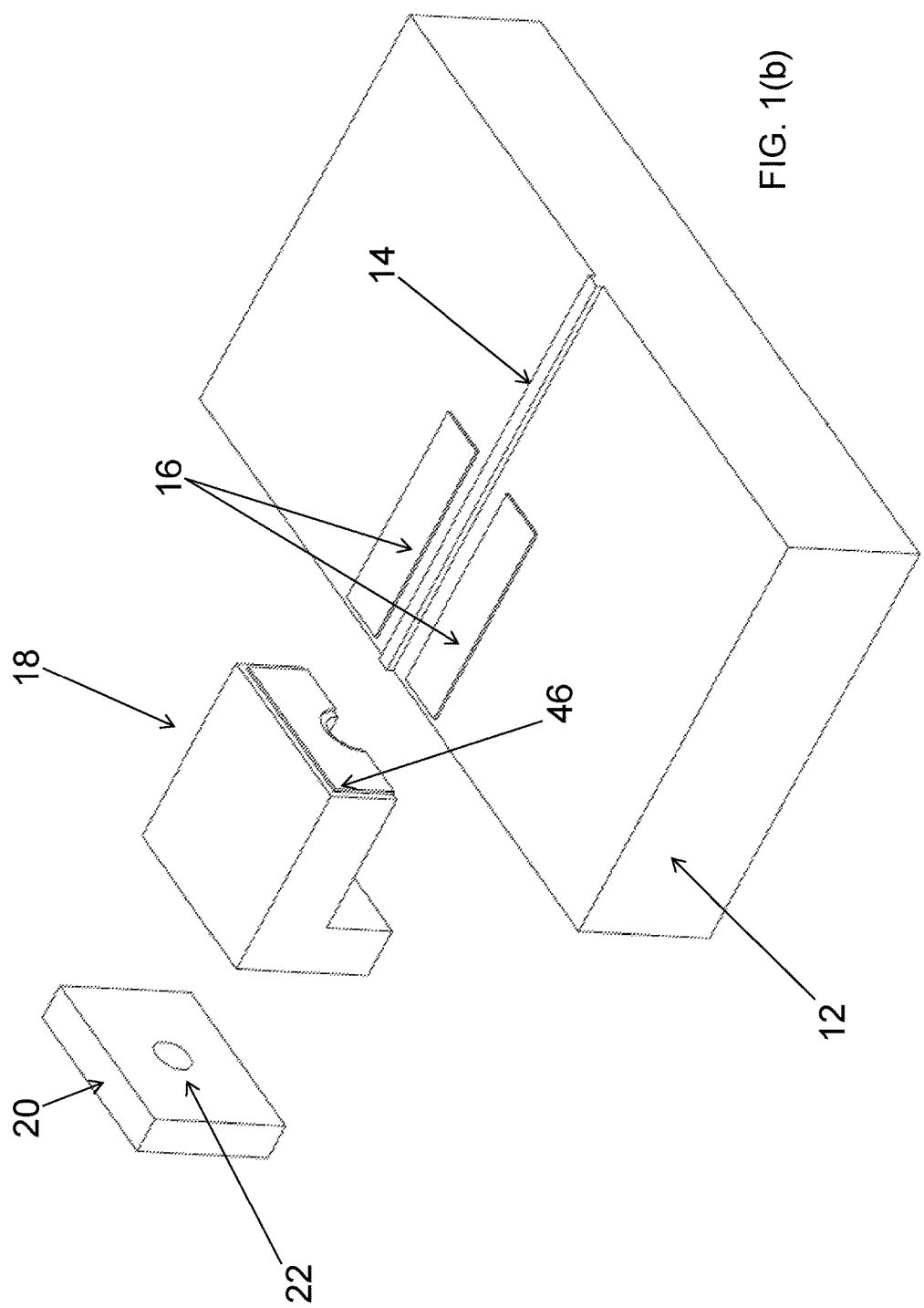
FIG. 1(b) shows an exploded view of the optical lens assembly mounted on a photonic integrated circuit block in FIG. 1(a).

FIGS. 1(a) and 1(b) show a silicon photonics package with an optical lens assembly 10 being mounted on a photonic integrated circuit (PIC) block 12 according to an embodiment of the present disclosure. An optical waveguide 14 may be formed on top of the PIC block 12. The waveguide 14 may be in the form of a strip with a thickness of several hundred nanometers, and may extend perpendicularly from an edge of the PIC block 12 for transmitting signal to a fiber. The PIC block to fiber coupling can be used to align the waveguide to the fiber, which may have a diameter of around 8 um. In the illustrated embodiment, two horizontal metal pads 16 with a thickness of around 0.1 um may be fixed on two sides of the waveguide 14. The optical lens assembly 10 may include an L-shaped mounting block 18 and an optical lens block 20. The optical lens block 20 may be formed with an optical lens 22 in a middle region thereof. The optical lens 22 may be a collimator lens, or any other suitable lens.

Figure 2A:
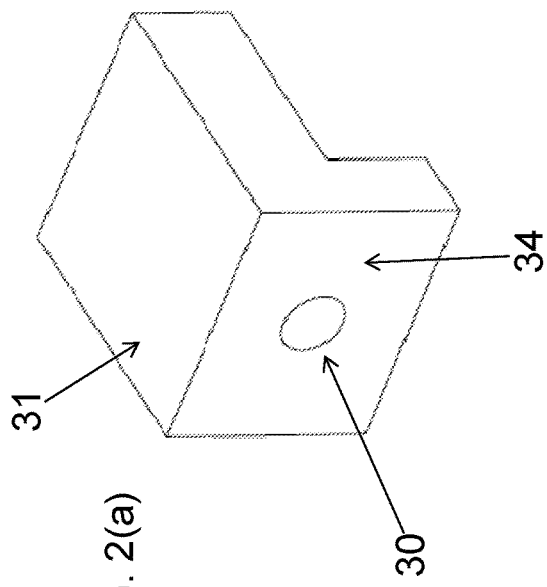
FIG. 2(a) is a top perspective view of an L-shaped mounting block according to an embodiment of the present disclosure.
Figure 2C:
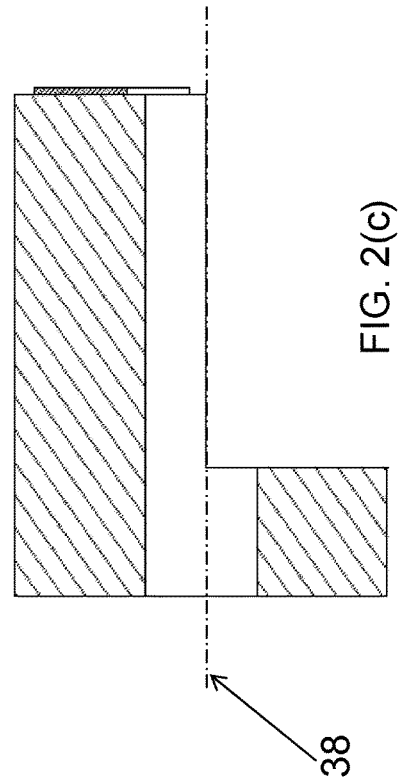
FIG. 2(c) is a cross sectional view of the L-shaped mounting block in FIG. 2(a).
Figure 2B:
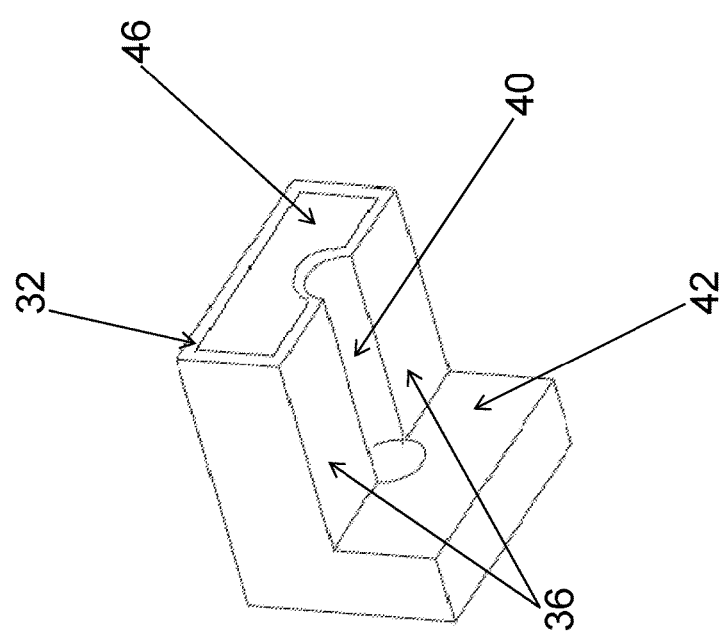
FIG. 2(b) is a bottom perspective view of the L-shaped mounting block in FIG. 2(a).

FIGS. 2(a), 2(b) and 2(c) show the details of the L-shaped mounting block 18 according to an embodiment of the present disclosure. The L-shaped mounting block 18 may be made from a cuboid having a through-hole 30 extending through opposite first/front and second/rear faces 32, 34 of the cuboid, and a rectangular block cut out from the cuboid.

The L-shaped mounting block 18 may include an L-shaped inner portion having two first/horizontal inner surfaces 36 lying in a plane 38 extending perpendicularly from the front face 32 and longitudinally bisecting a section of the through-hole 30, a bisected through-hole 40 formed between the two horizontal inner surfaces 36, and a second/vertical inner surface 42 lying perpendicularly to the two horizontal inner surfaces 36. As used herein, the word "bisect" means "cut into two parts, which are not necessary two exactly equal parts". In the illustrated embodiment, the through-hole 30 is circular in shape and the bisected through-hole 40 is semi-circular in shape. The L-shaped mounting block 18 may include an L-shaped outer portion having a top face 31 and the rear face 34. The optical lens block 20 may be bonded on the rear face 34 in a position such that a center of the optical lens 22 is lying in the plane 38 in which the two horizontal inner surfaces 36 lie.

The L-shaped mounting block 18 may further include a vertical metal pad 46 fixed on the front face 32. The vertical metal pad 46 may have two ends extending to two edges of the front face 32 and disposed at two opposite sides of the bisected through-hole 40 respectively.

FIG. 3 is a cross sectional view of the optical lens assembly 10 mounted on the PIC block 12. The PIC block 12 may have an edge along which a first/top wall 121 and a second/side wall 122 of the PIC block join. The optical waveguide 14 may be formed on the top wall 121 of the PIC block 12 and may extend perpendicularly from the edge.

Figure 4:
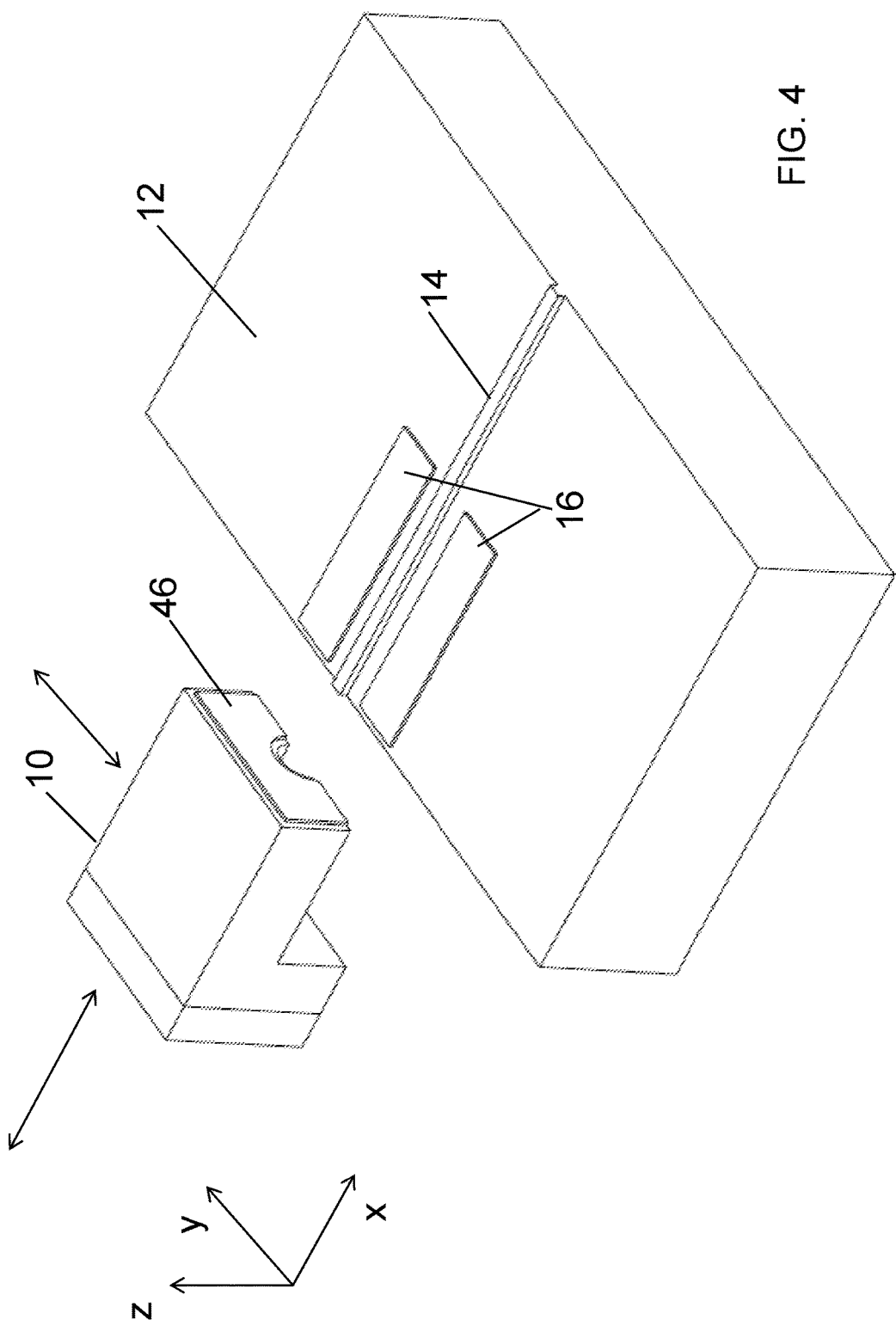
FIG. 4 shows active alignment of the optical lens assembly with a waveguide provided on a photonic integrated circuit block.

As shown in FIG. 4, the two horizontal metal pads 16 may extend perpendicularly from the edge of the PIC block 12, and the length of the two horizontal metal pads 16 may be longer than the length of the two horizontal inner surfaces 36 of the L-shaped mounting block 18. The thickness of the two horizontal metal pads 16 is minor compared to the height of optical waveguide 14.

The optical lens assembly 10 may be placed in a position such that the two horizontal inner surfaces 36 of the optical lens assembly 10 rest on the two horizontal metal pads 16 on the top wall 121 of the PIC block respectively. The vertical inner surface 42 of the optical lens assembly 10 may be facing the side wall 122 of the PIC block. The optical lens 22 may be optically aligned with the optical waveguide 14 along an optical path OP.

FIG. 4 also shows active alignment of the optical lens assembly 10 with the waveguide 14 provided on the PIC block 12 according to an embodiment of the present disclosure. First of all, the optical lens assembly 10 can be placed at the edge of the PIC block 12 in a position such that the two horizontal inner surfaces 36 of the optical lens assembly rest on the two horizontal metal pads 16 on the top wall 121 of the PIC block 12 respectively, thereby passively aligning the center of the optical lens 22 with the optical waveguide 14 in a Z direction perpendicular to the top wall 121 of the PIC block 12, and the vertical inner surface 42 of the optical lens assembly 10 is hanging on the edge and facing the side wall 122 of the PIC block 12 at a distance therefrom, as illustrated in FIG. 3. The two horizontal inner surfaces 36 may have a length and contact area sufficient to allow the optical lens assembly 10 to be securely mounted on the PIC block 12.

Then, the center of the optical lens 22 can be actively aligned with the optical waveguide 14 by adjusting the optical lens assembly 10 in a Y direction along the edge of the PIC block 12 and orthogonal to the Z direction.

Finally, the optical lens 22 and the optical waveguide 14 can be actively aligned optically to optimize optical coupling by adjusting the optical lens assembly 10 in an X direction along the optical waveguide 14 and orthogonal to the Y and Z directions. In the illustrated embodiment, the optical lens 22 is a collimator lens. Once it is placed by the active alignment at the focal length from the light emitting point of the waveguide, the light emitting from the waveguide 14 can be perfectly collimated.

The assemble process and active alignment method can provide three dimensional alignment with high accuracy. With the precise alignment between the optical lens and light from the PIC, it can provide a large margin for fiber alignment, hence, loose the tolerance of the fiber placement.

FIGS. 5(*a*) and 5(*b*) show the fixing of the optical lens assembly 10 on the PIC block 12 by soldering according to an embodiment of the present disclosure. After the optical lens 22 is aligned in an optimum position, the optical lens assembly 10 can be fixed on the PIC block 12. At this position, the two horizontal metal pads 16 extend beyond the vertical metal pad 46 at a certain distance to form two corners at which solder may apply. By applying solder 48 at the two corners, one of the two ends of the vertical metal pad 46 and a corresponding one of the two horizontal metal pads 16 can be soldered together. Similarly, another one of the two ends of the vertical metal pad 46 and another corresponding one of the two horizontal metal pads 16 can be soldered together. The two ends of the vertical metal pad 46 and the two horizontal metal pads 16 may have an area sufficient to allow wetting of solder during the soldering process.

Figure 6B:
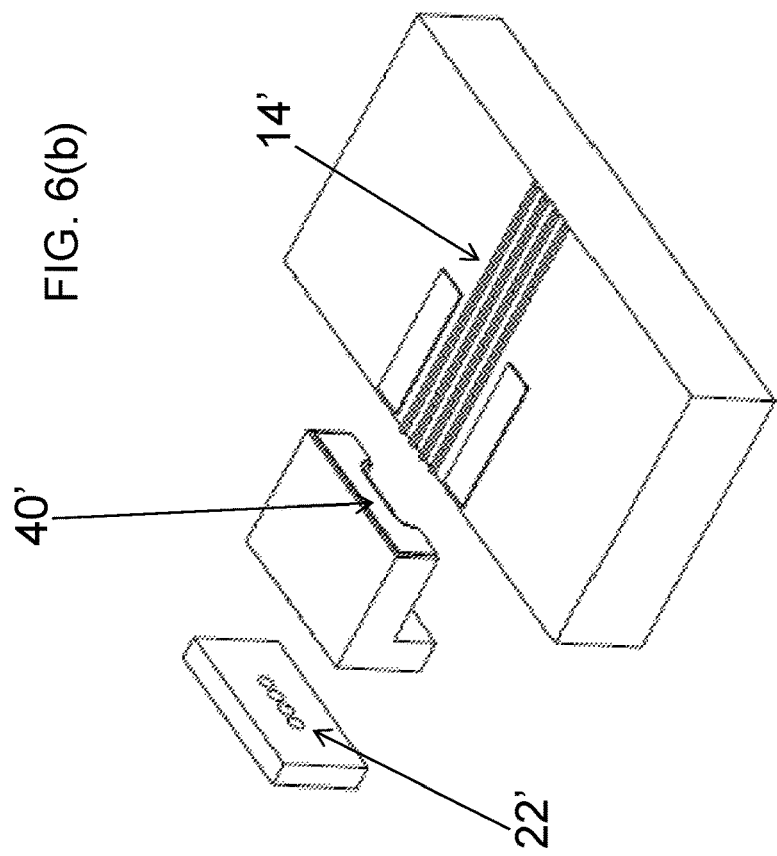
FIG. 6(b) shows an exploded view of the optical lens assembly mounted on a photonic integrated circuit block in FIG. 6(a).
Figure 6A:
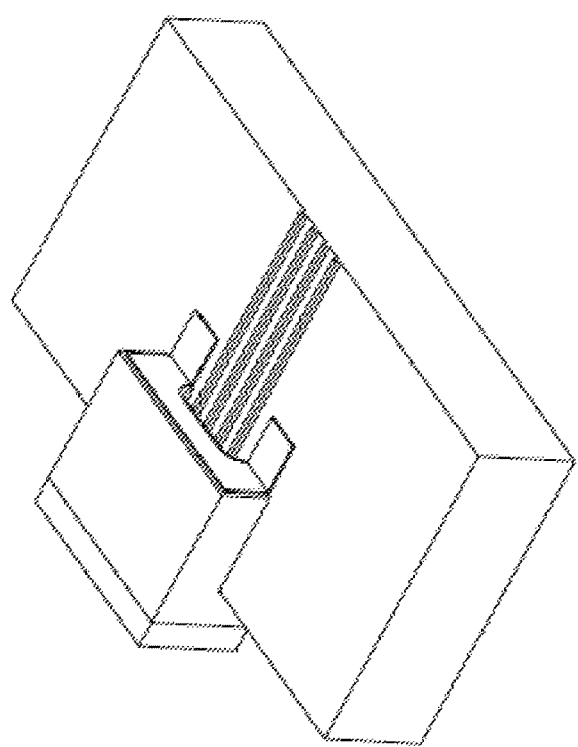
FIG. 6(a) is a perspective view of an optical lens assembly mounted on a photonic integrated circuit block according to another embodiment of the present disclosure.

FIGS. 6(*a*) and 6(*b*) show another embodiment of the present disclosure. Instead of a single lens 22 at the lens block 20, there is a lens array 22'. The lens array 22' can be inserted into one end of a through-hole 30' formed at a rear end of the L-shaped mounting block. The through-hole 30' may be oblong or rectangular in shape. A bisected through-hole 40' may be formed at a front end of the L-shaped mounting block. The centers of the lens in the lens array 22' can be aligned with an optical waveguide array 14' on the PIC block by the active alignment method described in FIG. 4. This kind of embodiment is particularly used in the scenario where the pitch of the waveguide array is quite small.

Figure 7:
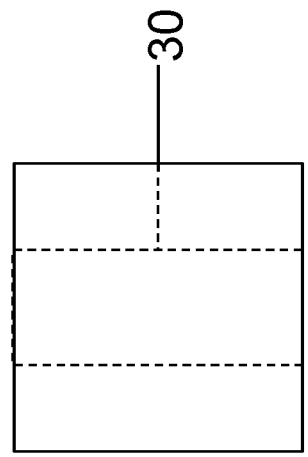
FIGS. 7(1) to 7(7b) show a process of fabricating the optical lens assembly according to an embodiment of the present disclosure.
Figure 7:
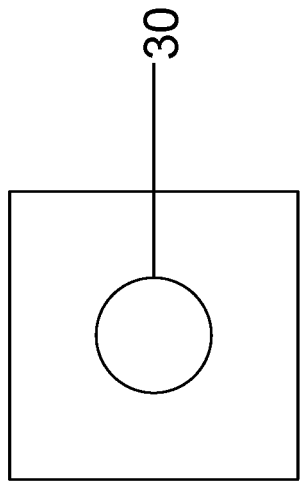
Figure 7:
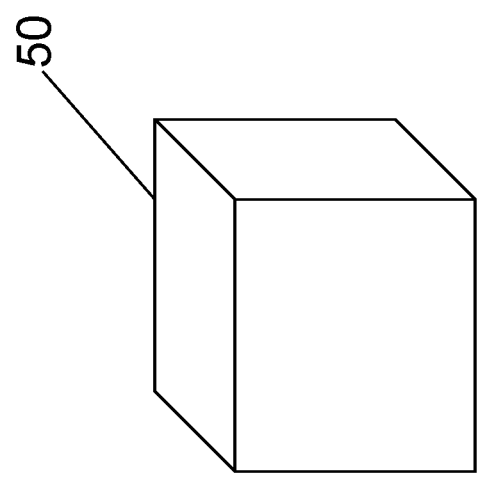
Figure 7:
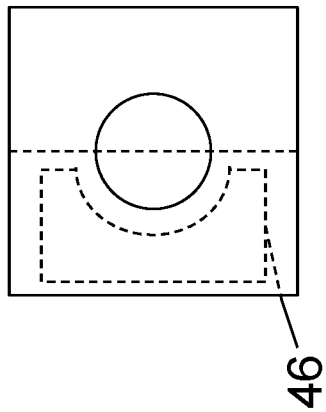
Figure 7:
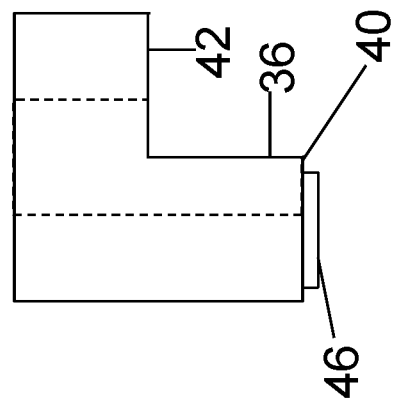
Figure 7:
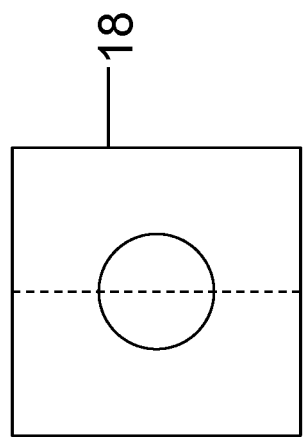
Figure 7:
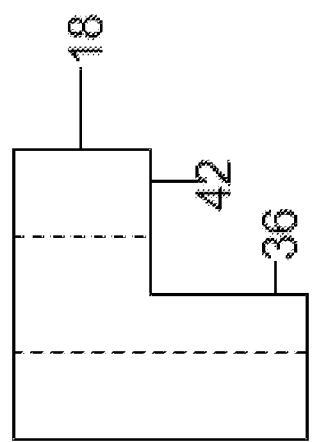
Figure 7:
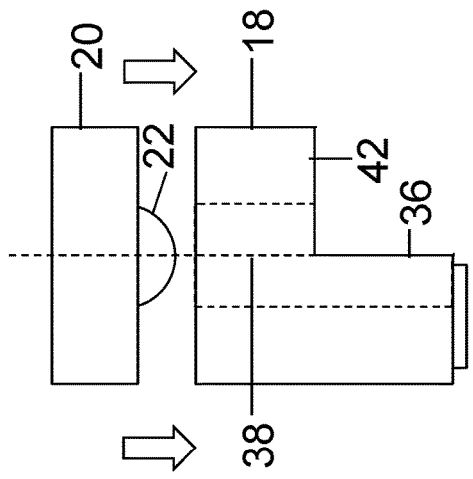
Figure 7:
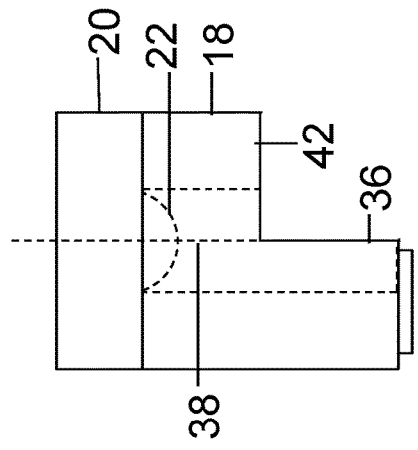
Figure 7:
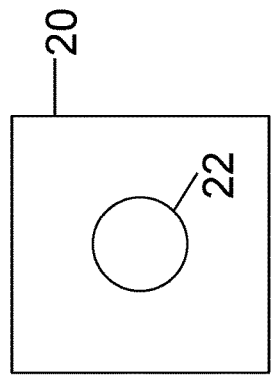
Figure 7:
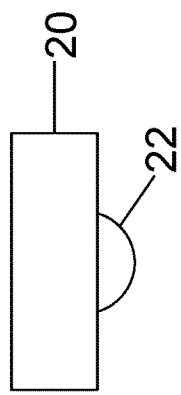
Figure 7:
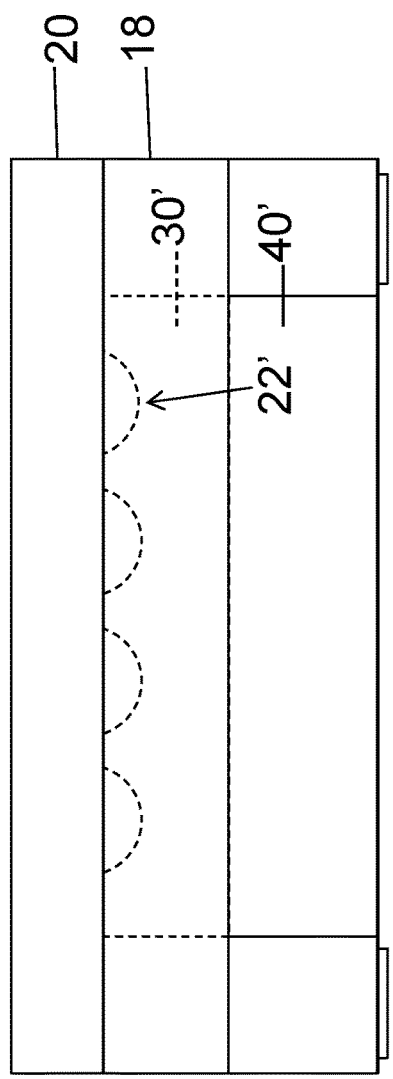
Figure 7:
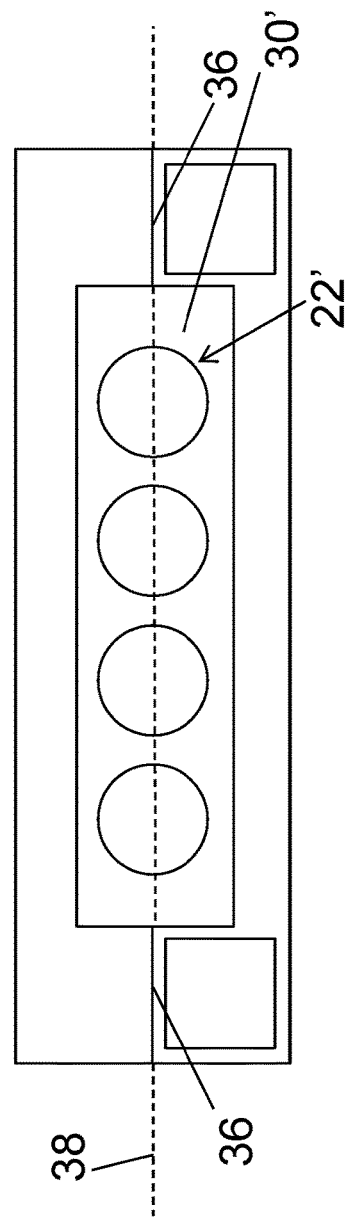

FIGS. 7(1) to 7(*7b*) show a process of fabricating the optical lens assembly 10 according to an embodiment of the present disclosure. As shown in FIG. 7(1), a cuboid 50 in the form of a solid body having six rectangular faces at right angle to each other may be provided. A through-hole of any possible shape may be formed through the cuboid 50.

As shown in FIGS. 7(*2a*) and 7(*2b*), a circular through-hole 30 may be formed through opposite first and second faces of the cuboid 50.

A rectangular block is cut out from the cuboid to form an L-shaped mounting block 18, as shown in FIGS. 7(*3a*) and 7(*3b*). The L-shaped mounting block 18 may be formed with an L-shaped inner portion, which may include two first inner surfaces 36 lying in a plane extending perpendicularly from the first face and longitudinally bisecting a section of the through-hole 30, a bisected through-hole 40 formed between the two first inner surfaces 36, and a second inner surface 42 lying perpendicularly to the two first inner surfaces 36. A first metal pad 46 may be fixed on the first face. The first metal pad 46 may have two ends extending to two edges of the first face and disposed at two opposite sides of the bisected through-hole 40 respectively, as shown in FIGS. 7(*4a*) and 7(*4b*).

As shown in FIGS. 7(*5a*) and 7(*5b*), an optical lens block 20 having an optical lens 22 formed in a middle region thereof may be provided. The optical lens block 20 may have a dimension matching the dimension of the second face of the L-shaped mounting block 18.

The optical lens block 20 may be bonded on the second face of the L-shaped mounting block 18 in a position such that a center of the optical lens 22 is lying in the plane 38 in which the two first inner surfaces 36 lie, as shown in FIGS. 7(*6a*) and 7(*6b*).

After the optical lens block 20 is bonded on the second face of the L-shaped mounting block 18, the optical lens 22 may be fitted into one end of the through-hole 30. This can ensure proper registration of the optical lens 22 in the through-hole 30 and facilitate accurate alignment of the center of the optical lens 22 with the optical waveguide 14. A tight contact can therefore be formed between the optical lens block 20 and the L-shaped mounting block 18. The L-shaped mounting block 18 and the optical lens block 20 together forms the optical lens assembly 10.

The optical lens 22 can also be configured as an optical lens array 22' on the lens block 20. All the optical lens in the lens array 22' may be fitted into one end of the through-hole 30' and all the centers of the optical lens in the lens array 22' are lying in the plane 38 in which the two first inner surfaces 36 lie, as shown in FIGS. 7(*7a*) and 7(*7b*). That facilitates accurate alignment of the centers of the optical lens in the lens array 22' with the waveguide array 14'.

Figure 8:
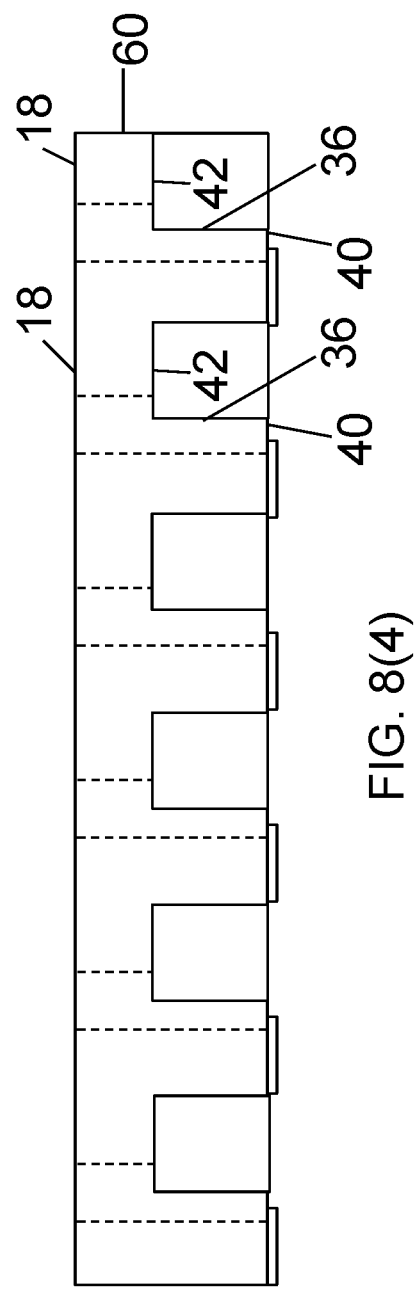
FIGS. 8(1) to 8(7b) show a process of batch fabricating the optical lens assembly according to an embodiment of the present disclosure.
Figure 8:
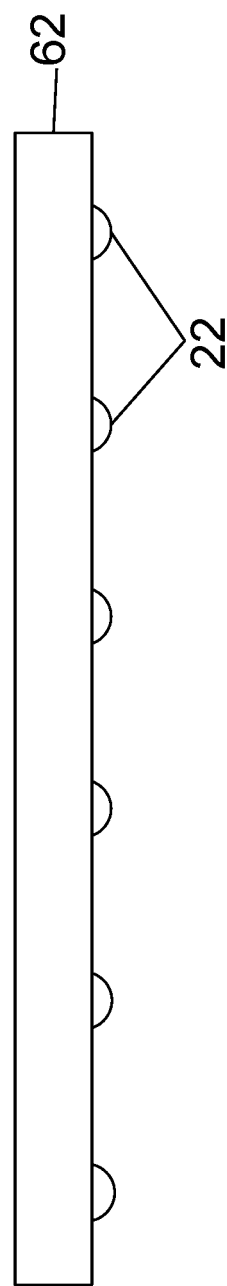
Figure 8:
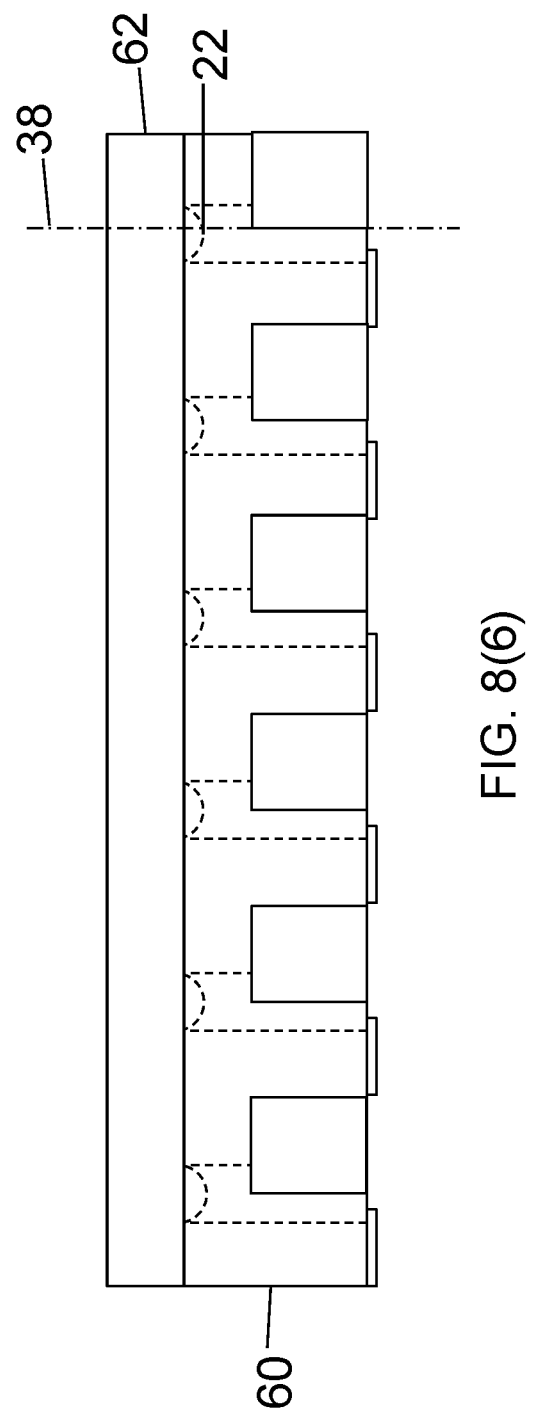
Figure 8:
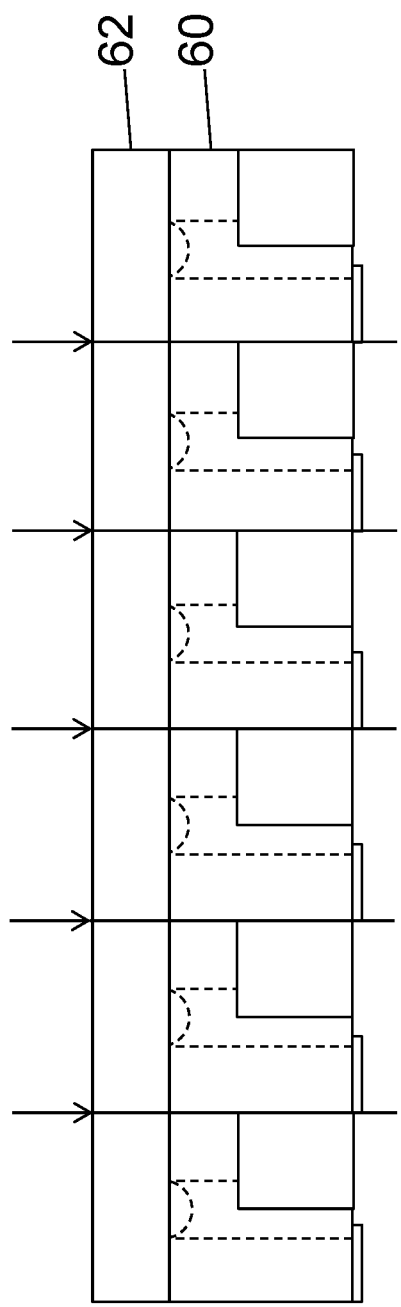
Figure 8:
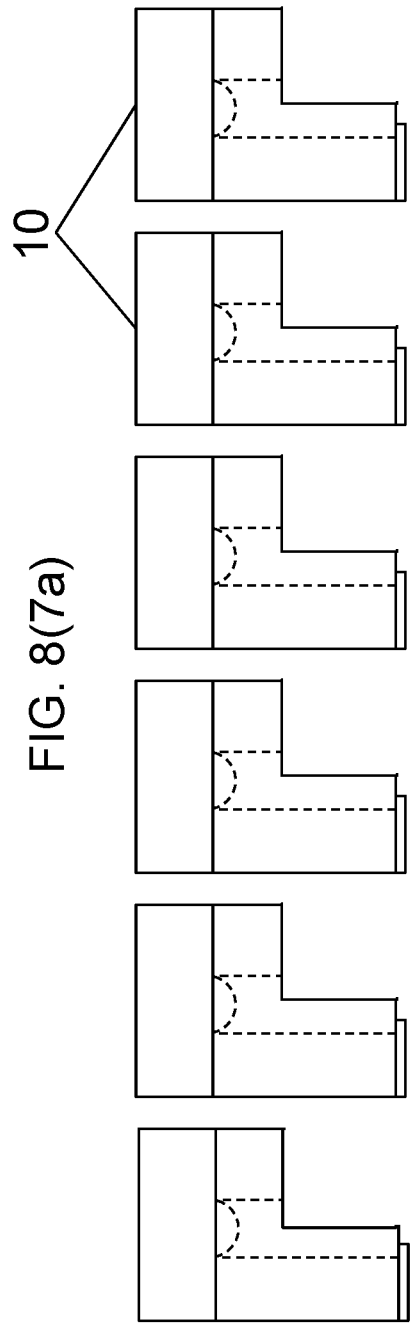

FIGS. 8(1) to 8(*7b*) show a process of batch fabricating the optical lens assembly according to an embodiment of the present disclosure. The optical lens assembly can be fabricated by semiconductor batch fabrication technology, which has the advantage of high volume and cost efficiency. A large number of L-shaped mounting blocks can be made from one silicon wafer, and a large number of optical lens blocks can be made from another silicon wafer. The batch fabricating process is described below in a cross section illustration.

A first round silicon wafer 60 having opposite first and second round faces and a certain thickness may be provided, as shown in FIG. 8(1).

A plurality of metal pads 46 may be attached on the first face over the wafer at a predetermined interval, as shown in FIG. 8(2).

A plurality of through-holes 30 may be formed. The through-hole 30 may extend through the first and second faces at the corresponding predetermined interval to the metal pads by a first deep reactive ion etching process, after wafer alignment by an alignment machine with 1 um accuracy, in a position such that two ends of each metal pad 46 extend to a plane extending perpendicularly from the first face and longitudinally bisecting a section of a corresponding through-hole 30, as shown in FIG. 8(3).

A plurality of rectangular blocks is removed from the first face over the wafer at the corresponding predetermined interval by a second deep reactive ion etching process, after wafer alignment by an alignment machine with 1 um accuracy, to form a plurality of pre-cut L-shaped mounting blocks 18, as shown in FIG. 8(4), each having an L-shaped inner portion including two first inner surfaces 36 lying in the plane extending perpendicularly from the first face and longitudinally bisecting the section of the through-hole 30, a bisected through-hole 40 formed between the two first inner surfaces 36, and a second inner surface 42 lying perpendicular to the two first inner surfaces 36.

A second round wafer 62 may be provided. The second wafer 62 may serve as an optical lens block having a plurality of optical lenses 22 formed at the corresponding predetermined interval, as shown in FIG. 8(5).

The second wafer 62 may be bonded on the second face of the first silicon wafer 60 in a position such that every optical lens 22 may be fitted into one end of the corresponding through hole 30 and its center is lying in the plane 38 in which the two first inner surfaces 36 lie, as shown in FIG. 8(6).

The bonded first and second wafers 60, 62 may be diced at the predetermined interval to form a plurality of single optical lens assemblies 10, as shown in FIGS. 8(7a) and 8(7b).

Figure 9A:
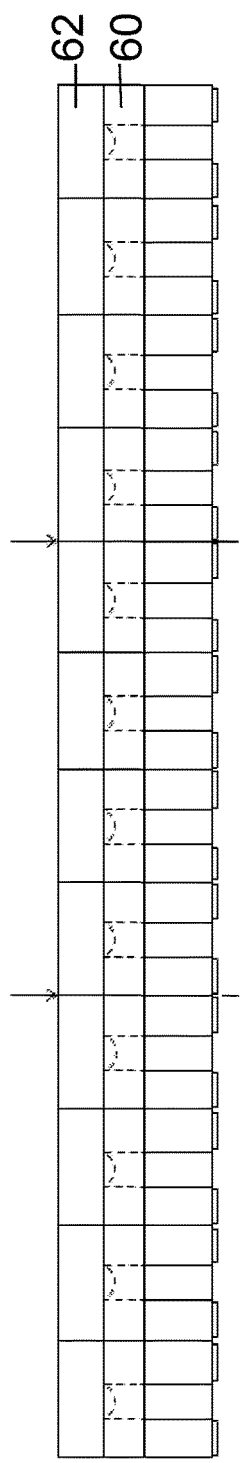
FIGS. 9(a) to 9(c) show a process of batch fabricating the optical lens assembly according to another embodiment of the present disclosure.
Figure 9B:
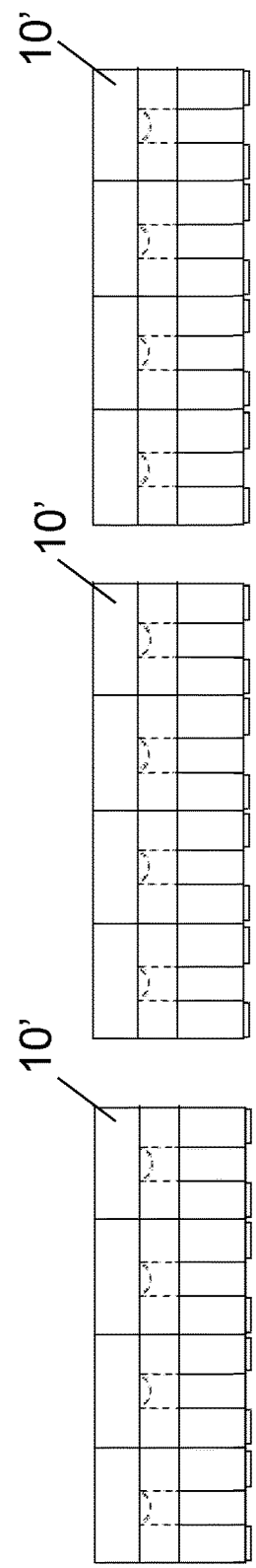
Figure 9C:
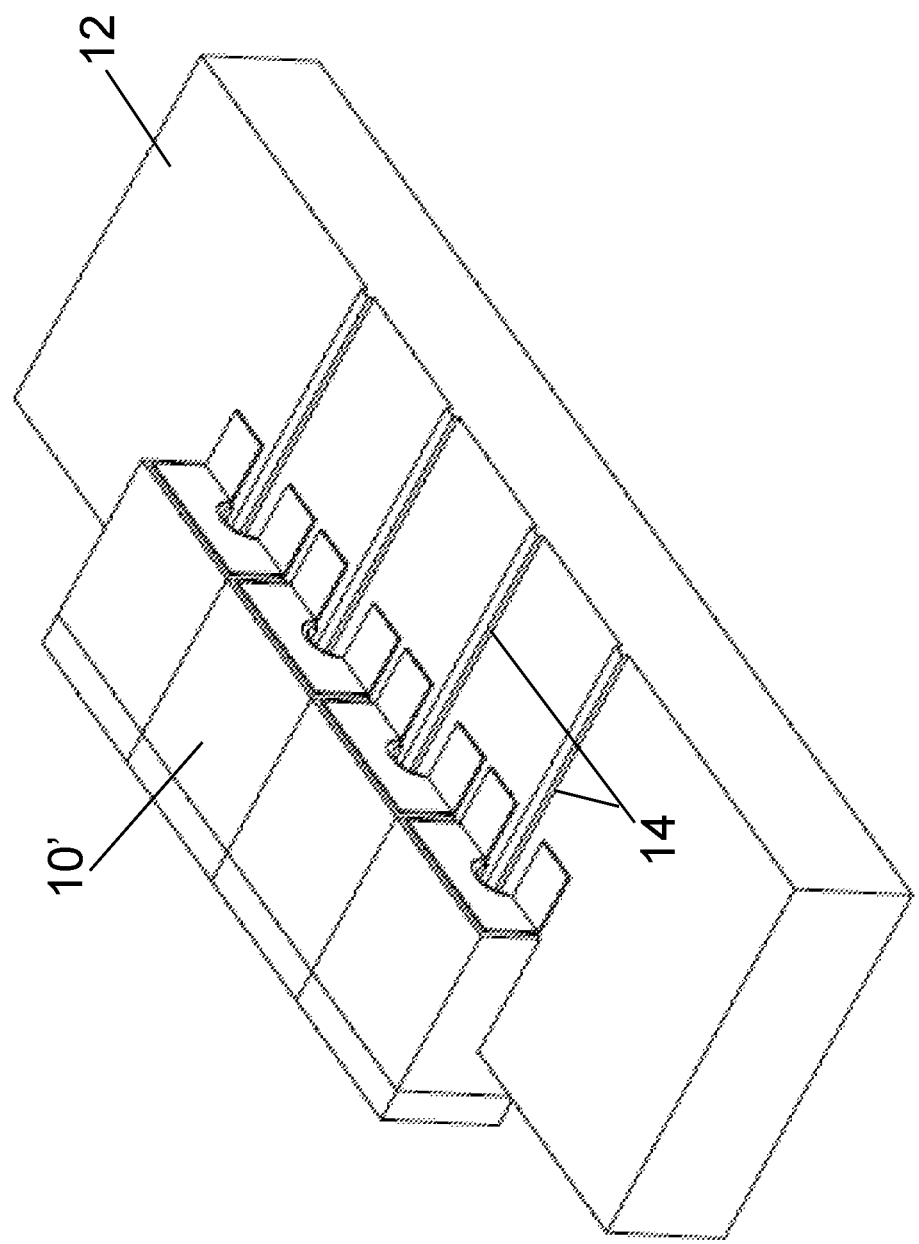

FIGS. 9(a) to 9(c) show a process of batch fabricating the optical lens assembly according to another embodiment of the present disclosure. The batch fabrication method also has the advantage of making an array of optical lens assemblies. Instead of dicing the bonded first and second wafers 60, 62 at the predetermined interval to form a plurality of single optical lens assemblies 10, the batch fabricating process may include the step of cutting the bonded first and second wafers 60, 62 at a wider interval which is a multiple of the predetermined interval to form a plurality of multiple optical lens assemblies.

As shown in FIGS. 9(a) and 9(b), an array of four optical lens assemblies 10' may be formed. The array of four optical lens assemblies 10' can be mounted on the PIC block 12 with four optical waveguides 14, as illustrated in FIG. 9(c), in a similar way as described before in relation to the single optical lens assembly 10.

While the present disclosure has been shown and described with particular references to a number of preferred embodiments thereof, it should be noted that various other changes or modifications may be made without departing from the scope of the appended claims.

What is claimed is:

1. A silicon photonics package comprising:
 an optical lens assembly comprising:
  a cuboid having a through-hole extending through opposite first and second faces of the cuboid, and
  a rectangular block cut out from the cuboid to form an L-shaped mounting block with an L-shaped inner portion comprising two first inner surfaces lying in a plane extending perpendicularly from the first face and longitudinally bisecting a section of the through-hole, a bisected through-hole formed between the two first inner surfaces, and a second inner surface lying perpendicularly to the two first inner surfaces; and
  an optical lens block having an optical lens or an optical lens array formed in a middle region thereof, the optical lens block being bonded on the second face in a position such that a center of the optical lens or a center of each optical lens in the optical lens array is lying in the plane in which the two first inner surfaces lie.

2. The silicon photonics package as claimed in claim 1, further comprising a first metal pad fixed on the first face, the first metal pad having two ends extending to two edges of the first face and disposed at two opposite sides of the bisected through-hole respectively.

3. The silicon photonics package as claimed in claim 2, further comprising:
 a photonic integrated circuit block having an edge along which a first wall and a second wall of the photonic integrated circuit block join, an optical waveguide or a waveguide array provided on the first wall of the photonic integrated circuit block and extending perpendicularly from the edge; and
 two second metal pads fixed on the first wall of the photonic integrated circuit block at two opposite sides of the optical waveguide or the waveguide array respectively;
 wherein the optical lens assembly is fixed at the edge of the photonic integrated circuit block by solders applied between the two ends of the first metal pad and the two second metal pads in a position such that the two first inner surfaces of the optical lens assembly rest on the two second metal pads on the first wall of the photonic integrated circuit block respectively, the second inner surface of the optical lens assembly is facing the second wall of the photonic integrated circuit block, and the optical lens is optically aligned with the optical waveguide.

4. The silicon photonics package as claimed in claim 2, wherein the two second metal pads have a thickness of 0.1 um.

5. The silicon photonics package as claimed in claim 2, wherein the two second metal pads extend perpendicularly from the edge of the photonic integrated circuit block and have a length longer than that of the two first inner surfaces of the optical lens assembly.

6. The silicon photonics package as claimed in claim 1, wherein the through-hole is circular, oblong, or rectangular in shape.

7. The silicon photonics package as claimed in claim 1, wherein the optical lens is a collimator lens.

8. A method of fabricating the silicon photonics package of claim 1, the method comprising:
 forming an optical lens assembly, the step of forming the optical lens assembly comprising:
  providing a cuboid;
  forming a through-hole extending through opposite first and second faces of the cuboid;
  cutting a rectangular block out from the cuboid to form an L-shaped mounting block with an L-shaped inner portion comprising two first inner surfaces lying in a plane extending perpendicularly from the first face and longitudinally bisecting a section of the through-hole, a bisected through-hole formed between the two first inner surfaces, and a second inner surface lying perpendicularly to the two first inner surfaces;
  providing an optical lens block having an optical lens or an optical lens array formed in a middle region thereof; and
  bonding the optical lens block on the second face in a position such that a center of the optical lens or a center of each optical lens in the optical lens array is lying in the plane in which the two first inner surfaces lie.

9. The method as claimed in claim 1, further comprising: fixing a first metal pad on the first face, the first metal pad having two ends extending to two edges of the first face and disposed at two opposite sides of the bisected through-hole respectively.

10. The method as claimed in claim 9, further comprising:
providing a photonic integrated circuit block having an edge along which a first wall and a second wall of the photonic integrated circuit block join, an optical waveguide or a waveguide array provided on the first wall of the photonic integrated circuit block and extending perpendicularly from the edge; and
attaching two second metal pads on the first wall of the photonic integrated circuit block respectively at two opposite sides of the optical waveguide or the waveguide array.

11. The method as claimed in claim 10, further comprising:
placing the optical lens assembly at the edge of the photonic integrated circuit block in a position such that the two first inner surfaces of the optical lens assembly rest on the two second metal pads on the first wall of the photonic integrated circuit block respectively, thereby passively aligning the center of the optical lens with the optical waveguide, or the centers of the optical lenses in the optical lens array with the waveguide array, in a Z direction perpendicular to the first wall of the photonic integrated circuit block, and the second inner surface of the optical lens assembly is hanging on the edge and facing the second wall of the photonic integrated circuit block at a distance therefrom;
actively aligning the center of the optical lens with the optical waveguide or the centers of the optical lenses in the optical lens array with the waveguide array by adjusting the optical lens assembly in a Y direction along the edge of the photonic integrated circuit block and orthogonal to the Z direction; and
actively aligning the optical lens with the optical waveguide or the optical lenses in the optical lens array with the waveguide array optically to optimize optical coupling by adjusting the optical lens assembly in an X direction along the optical waveguide and orthogonal to the Y and Z directions.

12. The method as claimed in claim 11, further comprising: after the aligning steps, fixing the optical lens assembly on the photonic integrated circuit block by soldering one of the two ends of the first metal pad and a corresponding one of the two second metal pads together, and soldering another one of the two ends of the first metal pad and another corresponding one of the two second metal pads together.

13. The method as claimed in claim 10, wherein the two second metal pads have a thickness of 0.1 um.

14. The method as claimed in claim 10, wherein the two second metal pads extend perpendicularly from the edge of the photonic integrated circuit block and have a length longer than that of the two first inner surfaces of the optical lens assembly.

15. The method as claimed in claim 1, wherein the through-hole is circular, oblong, or rectangular in shape.

16. The method as claimed in claim 1, wherein the optical lens is a collimator lens.

17. A method of batch fabricating of optical lens assemblies for silicon photonics packaging, the method comprising:
(a) providing a first silicon wafer having opposite first and second faces;
(b) attaching a plurality of metal pads on the first face in at a predetermined interval;
(c) forming a plurality of through-holes extending through the first and second faces at the corresponding predetermined interval by a first deep reactive ion etching process after wafer alignment, in a position such that two ends of each metal pad extend to a plane extending perpendicularly from the first face and longitudinally bisecting a section of a corresponding through-hole;
(d) removing a plurality of rectangular blocks from the first face at the predetermined interval by a second deep reactive ion etching process after wafer alignment to form a plurality of pre-cut L-shaped mounting blocks, each having an L-shaped inner portion comprising two first inner surfaces lying in the plane extending perpendicularly from the first face and longitudinally bisecting the section of the through-hole, a bisected through-hole formed between the two first inner surfaces, and a second inner surface lying perpendicular to the two first inner surfaces;
(e) providing a second silicon wafer defining an optical lens block having a plurality of optical lenses or lens arrays formed in a middle region thereof at the predetermined interval;
(f) bonding the second silicon wafer on the second face of the first silicon wafer in a position such that a center of each optical lens is lying in the plane in which the two first inner surfaces lie; and
(g) dicing the bonded first and second silicon wafers at the predetermined interval to form a plurality of single optical lens assemblies.

18. The method of batch fabricating of optical lens assemblies for silicon photonics packaging as claimed in claim 17, comprising replacing the dicing step by cutting the bonded first and second silicon wafers at a wider interval which is a multiple of the predetermined interval to form a plurality of multiple optical lens assemblies.

19. The method of batch fabricating of optical lens assemblies for silicon photonics packaging as claimed in claim 17, wherein the through-hole is circular, oblong, or rectangular in shape.

20. The method of batch fabricating of optical lens assemblies for silicon photonics packaging as claimed in claim 17, wherein the optical lens is a collimator lens.

\* \* \* \* \*